United States Patent [19]

Wood et al.

[11] 4,162,186

[45] Jul. 24, 1979

[54] ALKALINE SURFACTANT SYSTEM FOR DE-INKING PRINTED FIBROUS MATERIAL

[75] Inventors: Donald C. Wood, Des Plaines; Robert L. McLaughlin, Wilmette, both of Ill.

[73] Assignee: DeSoto, Inc., Des Plaines, Ill.

[21] Appl. No.: 880,660

[22] Filed: Feb. 23, 1978

Related U.S. Application Data

[63] Continuation-in-part of Ser. No. 750,850, Dec. 15, 1976, abandoned.

[51] Int. Cl.$^2$ .............................................. D21C 5/02
[52] U.S. Cl. .......................................... 162/5; 162/7; 162/8
[58] Field of Search ..................................... 162/5, 7, 8

[56] References Cited

U.S. PATENT DOCUMENTS

| | | | |
|---|---|---|---|
| 3,808,089 | 4/1974 | Von Koeppen et al. | 162/5 |
| 3,822,178 | 7/1974 | Von Koeppen et al. | 162/5 |
| 3,932,206 | 1/1976 | Illingworth et al. | 162/5 |

FOREIGN PATENT DOCUMENTS

| | | | |
|---|---|---|---|
| 51-40403 | 4/1976 | Japan | 162/5 |
| 1347971 | 2/1974 | United Kingdom | 162/5 |

Primary Examiner—S. Leon Bashore
Assistant Examiner—William F. Smith
Attorney, Agent, or Firm—Dressler, Goldsmith, Clement, Gordon & Shore, Ltd.

[57] ABSTRACT

A de-inking process for removing ink and other substances from printed paper which process is capable of providing de-inked paper stock having improved brightness. The process utilizes an aqueous de-inking solution containing a mixture of certain surfactants, at least one surfactant being a water-soluble nonionic surfactant and the other surfactant being an oil-soluble nonionic surfactant. De-inking is carried out at a temperature in the range of about room temperature to about the boiling temperature of the solution by forming a slurry of the printed paper in the solution having a predetermined fibrous material solids content. The total nonionic surfactant concentration in the de-inking solution can be about 0.1 to about 5 weight percent, preferably about 0.5 to about 2.5 weight percent, based on the amount of fibrous material solids present. The weight ratio of the water-soluble surfactant to the oil-soluble surfactant in the mixture is in a range of about 6:1 to about 3:1, preferably about 4:1.

19 Claims, No Drawings

ALKALINE SURFACTANT SYSTEM FOR DE-INKING PRINTED FIBROUS MATERIAL

CROSS-REFERENCE TO RELATED APPLICATION

This application is a continuation-in-part of our co-pending application U.S. Ser. No. 750,850, filed on 15 Dec., 1976, now abandoned.

BACKGROUND OF THE INVENTION

This invention relates to a process for de-inking printed fibrous materials to produce a high quality stock. In particular, this invention is directed to a de-inking process for printed paper that utilizes an aqueous, de-inking solution containing a mixture of nonionic surfactants and produces a paper stock of high quality.

Paper manufacture does not unduly damage or alter the character of the essential fibers from which paper is made, therefore such fibers may be recovered from used or waste paper and reused for the manufacture of new paper stock. From a practical standpoint, the principal criterion that determines the commercial value and acceptability of a particular de-inking process is the capacity to economically upgrade printed paper stock to the quality and color of the original paper stock. Important factors in determining the quality of the upgraded paper stock are the brightness and/or the whiteness of the paper stock. These factors are improved by the de-inking process of this invention.

Many processes for de-inking waste paper utilizing aqueous solutions containing surfactants, usually in the presence of phosphate-type water softening agents, are known in the art, and have been used to recover fibers from printed paper for subsequent reuse. These processes are undesirable from an ecological standpoint because of the presence of the phosphates and are generally expensive because the de-inking operation usually is carried out at elevated temperatures. Furthermore, the paper pulp derived therefrom is not of sufficient brightness to be used for the manufacture of high quality paper stock. Illustrative proposed prior art processes for waste paper de-inking are disclosed in U.S. Pats. No. 3,056,713 to Gaertner, No. 3,069,308 to Lissant, No. 3,098,784 to Gorman, Jr., No. 3,354,026 to Illingworth, No. 3,354,028 to Illingworth et al., No. 3,392,083 to Illingworth, No. 3,446,696 to Illingworth, No. 3,501,373 to Illingworth, No. 3,808,089 to Von Koeppen et al., No. 3,932,206 to Illingworth et al. and in French Pat. No. 1,453,204. Another illustrative prior art process is disclosed in British Pat. No. 1,347,971 according to which paper to be de-inked is first impregnated with an oil-soluble, substantially water-insoluble surfactant, then pulped in an aqueous alkaline medium, and subsequently recovered therefrom. However, none of these prior art processes suggests the use of an aqueous, phosphate-free de-inking solution which contains a mixture of water-soluble and oil-soluble nonionic surfactants having certain properties, and which is capable of effective de-inking even at about room temperature and at relatively low surfactant concentration in the solution. These features are of considerable significance in that a realatively inexpensive and ecologically compatible de-inking process is provided.

SUMMARY OF THE INVENTION

According to the present invention, de-inking of a printed fibrous material, especially printed paper, is carried out in an aqueous medium utilizing a surfactant blend or mixture constituted by at least one water-soluble nonionic surfactant and at least one oil-soluble nonionic surfactant in a respective weight ratio of about 6:1 to about 3:1, preferably about 4:1.

Paper stock that has been de-inked using the method of the present invention exhibits improved brightness and whiteness.

In practicing the present invention, the printed paper, in substantially dry form, is added to the aqueous, surfactant-containing de-inking solution in an amount to form a slurry containing no more than about 10 weight percent of fibrous material solids upon pulping. During de-inking, this slurry is maintained at a temperature in the range of about room temperature to about the boiling temperature of the solution, depending on the type of paper that is to be treated. For magazine stock, ledger stock, wax-coated paper, and the like de-inking is carried out preferably at a temperature in excess of about 140° F., and more preferably at a temperature of about 160° F. to about 180° F. For newsprint, and the like, the de-inking is carried out preferably at a temperature of about 70° F. to about 120° F., and more preferably at a temperature of about 70° F. to about 90° F.

The boiling temperature of the solution can be elevated by performing the de-inking treatment at an elevated pressure.

The nonionic surfactants are together present in the de-inking solution in an amount of about 0.1 to about 5 weight percent, based on the weight of the fibrous material solids present, and preferably in an amount to provide a critical micelle concentration of surfactants for the de-inking solution.

The slurry of fibrous material solids in the de-inking solution is agitated at the specified de-inking temperature to reduce the fibrous material substantially to individual fibers and to separate the ink present on the fibers.

DESCRIPTION OF PREFERRED EMBODIMENTS

The process embodying the present invention is generally carried out by pulping dry printed waste paper with the de-inking solution in an agitated vessel, such as a conventional high-speed pulper commercially available under the designation "Hydropulper," to produce a slurry having a fibrous material solids content of no more than about 10 weight percent, preferably about 3 to about 8 weight percent. The solids content in any given instance depends on the type of waste paper that is to be de-inked. For example, for de-inking ledger paper and the like the slurry more preferably has a fibrous material solids content of about 3 to 4 weight percent and for de-inking magazine stock the slurry more preferably has a fibrous material solids content of about 6 to about 8 weight percent. The pulping and attendant agitation reduce the fibrous material charged to the "Hydropulper," i.e., the printed waste paper, to individual fibers and are continued until the ink present on the fibers separates therefrom. Generally, in a batch process, the pulping and agitation are carried out for a time period of about 10 minutes to about one hour, and comparable processing times can be utilized in a continuous process.

The nature of the nonionic surfactants that are present in the de-inking solution is very important. Balanced amounts of both a water-soluble and an oil-soluble surfactant should be present. The relative amounts of these surfactants can vary, however, between certain limits. In particular, the respective weight ratio of the water-soluble surfactant to the oil-soluble surfactant can range from about 6:1 to about 3:1, and preferably is about 4:1. When the weight ratio of the water-soluble surfactant to the oil-soluble surfactant exceeds about 6:1, it has been found that all of the ink particle carrier residues present in the waste paper are not removed and that brightness of the recovered paper stock decreases. On the other hand, an excess relative amount of the oil-soluble surfactant in the solution hinders the detergency action of the water-soluble surfactant that is present, again with a detrimental effect on brightness. No phosphate-type water softeners or the like are necessary or desirable when the presently contemplated surfactant mixture is used.

The total amount of nonionic surfactants present in the de-inking solution is determined by the amount of fibrous material solids that is present. Broadly, the surfactant concentration can be about 0.1 to about 5 weight percent, based on the weight of fibrous material solids present, and preferably is about 0.5 to about 2.5 weight percent. Optimum de-inking is achieved when the surfactant concentration in the de-inking solution is at about the critical micelle concentration for the solution, which concentration varies with the specific surfactants that constitute the surfactant blend, the presence or absence of other organic compounds and inorganic salts, and similar factors. However, the critical micelle concentration in each instances is readily ascertainable by one skilled in the art, e.g., by means of surface tension or electrical conductance measurements.

The critical micelle concentration for a surfactant solution is defined as the concentration of surfactant micelles at which the rate of increase of electrical conductance with increase in concentration levels off or proceeds at a much slower rate, and physically closely coincides with the approximate minimum surface tension attainable within the de-inking system. A general discussion of critical micelle concentrations in detergent systems can be found in Preston, "Some Correlating Principles of Detergent Action," J. Phys. & Colloid Chem. 52, 84–97 (1948).

A wide variety of water-soluble nonionic surfactants suitable for practicing the present invention is available. Particularly suitable are surfactants derived from substantially water-insoluble aliphatic monohydric alcohols and aliphatic diols by alkoxylation, utilizing techniques well known in the art. On the basis of environmental considerations, biodegradable nonionic surfactants which are non-toxic to aquatic life are preferred.

The term "water-soluble," as used herein and in the appended claims with reference to nonionic surfactants, means that an aqueous solution containing 1 percent by weight of the surfactant will be clear, without observable haze being present. Also, generally water-soluble nonionic surfactants have a relatively high hydrophile-lipophile balance (HLB) value, i.e., about 10 to about 20. Water-insoluble nonionic surfactants, on the other hand, tend to have a low HLB value, generally less than 10.

An illustrative group of preferred water-soluble nonionic surfactants is represented by the ethoxylated primary aliphatic alcohols in which the hydrophobic portions of the surfactant molecules are straight chain alcohol residues and the hydrophilic portions are poly(ethyleneoxy) chains. For example, primary alcohols have 5 to 20 carbons can be used for providing the hydrophobic portion of the surfactant molecule. The average mole ratio of ethyleneoxy units to the alcohol in the surfactant can be about 7 to about 50 and higher. For ethoxylated primary alcohols to be water soluble, usually about 7 moles of ethylene oxide per mole of the alcohol must be present; however, water solubility is also affected to some degree by the length of the carbon chain present in the hydrophobic portion of the molecule. For instance, an alcohol having a chain of about 5 to about 8 carbon atoms has relatively low hydrophobicity, thus the desired water solubility can be achieved with as little as 6.5 moles of ethylene oxide per mole of alcohol. Accordingly, the term "about 7," as used herein, is intended to embrace degrees of ethoxylation somewhat below 7 moles of ethylene oxide per mole of alcohol as long as the requisite water-solubility is present.

Preferred for the present de-inking process are the ethoxylated aliphatic alcohols derived from mixtures of primary linear $C_9$–$C_{11}$ or $C_{12-15}$ aliphatic alcohols having on the average about 7 to about 15 ethyleneoxy units, and preferably about 7 to 8 ethyleneoxy units per mole of alcohol. Water-soluble nonionic surfactants falling within the foregoing category are commercially available under the designations "NEODOL-91-8", NEODOL-25-7," "NEODOL-25-9" and "NEODOL-25-12." NEODOL-91-8" is a nonionic surfactant derived from a mixture of primary linear $C_{9-11}$ aliphatic alcohols and contains about 8 ethyleneoxy units per mole of alcohol. These "NEODOL" products are available from Shell Chemical Co. The latter nonionic surfactants, on the other hand, are derived from mixtures of primary linear $C_{12-15}$ aliphatic alcohols and contain about 7, 9 and 12 ethyleneoxy units per mole of alcohol, respectively.

Another illustrative group of suitable water-soluble nonionic surfactants is represented by the ethoxylated secondary alcohols. For example, secondary aliphatic alcohols having 11 to 15 carbon atoms can be ethoxylated to provide an average ethyleneoxy-to-alcohol mole ratio of about 7:1 to about 15:1, preferably about 7:1 to about 9:1. The foregoing types of non-ionic surfactants are commercially available under the designations "TERGITOL 15-S-7," "TERGITOL 15-S-9," "TERGITOL 15-S-12," and "TERGITOL 15-S-15." These "TERGITOL" products are available from Union Carbide Corp.

Also suitable are the water-soluble nonionic surfactants derived from ethoxylated aliphatic diols containing about 8 to about 150 ethyleneoxy units per mole of diol. Preferred groupings of diol-derived surfactants comprise ethoxylated aliphatic diols containing about 25 to about 150 ethyleneoxy units per mole of diol having about 8 to about 30 carbon atoms, and ethoxylated diols containing about 8 to about 30 ethyleneoxy units per mole of diol having less than about 8 carbon atoms. Illustrative of the foregoing surfactants are the $C_{12-15}$ nonterminal diol adducts containing about 30 ethyleneoxy units per mole of the diol, and the like.

Yet another group of water-soluble nonionic surfactants is illustrated by oxyalkylene block copolymers which are polyols containing at least some terminal secondary hydroxyl groups. The hydrophobic element of the low-forming nonionic surfactant preferably is a polyoxypropylene chain which terminates the block copolymer, and the hydrophilic element thereof preferably is a polyoxyethylene chain which constitutes an interior portion of the block copolymer. The nonionic surfactants of this type most suitable for the present purposes are the water-soluble polyoxypropylene-polyoxyethylene condensates having an average molecular weight of about 2000 to about 4000 and exhibit a form height of about 5 millimeters, or less, when a 0.1 weight percent aqueous solution thereof at about 120° F. is sprayed through an orifice for 10 minutes in accordance with a test procedure described in greater detail hereinbelow. These condensates usually contain from about 2 to about 9 moles of propylene oxide per molecule of polyoxyethylene in the hydrophobic core.

Typical illustrative nonionic surfactants within the foregoing category are the water-soluble, liquid polyols having terminal secondary hydroxyl groups and a relatively low cloud point. These polyols are commercially available from BASF Wyandotte Corporation under the designation "Pluronic R", such as the water-soluble polyol having a molecular weight of about 3120 and cloud point of about 33° C. in a 1 percent aqueous solution, commercially available under the designation "Pluronic 25R2".

Also suitable are the liquid polyols derived from candensation products of a hydrophobic polyoxyalkylene polymer with hydrophilic chains that are mixed polyoxyethylene-poly-oxypropylene chains. Liquid polyols of this particular type are disclosed in U.S. Pat. No. 3,101,374 to Patton, Jr.

The fatty acid alkanol amides, such as the diethanol-fatty acid amide condensates, are also suitable water-soluble nonionic surfactants. Commercial surfactants of the foregoing type are available under the designations "Clindrol 200 CGN," available from Clintwood Chemical Co.) "Aminol COR-2" (available from Finetex Inc..) and "Ardet DC." (available from Ardmore Chemical Co.).

Another type of water-soluble nonionic surfactant that can be used is a condensation product of an alkyl phenol with ethylene oxide containing a sufficient number of ethyleneoxy units per mole of the alkyl phenol to render the surfactant water soluble, usually at least about 7 ethyleneoxy units per mole of the alkyl phenol. Illustrative surfactants of this particular type are octylphenoxy polyethoxy ethanol containing about 7 to 8 ethyleneoxy units and commercially available under the designation "TRITON X-114," available from Rohm & Haas Co.), a nonylphenoxy polyethoxy ethanol containing about 20 ethyleneoxy units and commercially available under the designation "SURPHONIC N-200," (available from Jefferson Chemical Co., Inc.) and the like.

The oil-soluble nonionic surfactants that are combined with the aforementioned water-soluble nonionic surfactants to form the de-inking solutions which embody the present invention can be aliphatic primary or secondary alcohols containing about 5 to about 20 carbon atoms and having a relatively low degree of ethoxylation, i.e., about 0.5 to about 3.5 ethyleneoxy units per mole of the alcohol. An illustrative oil-soluble surfactant is an ethoxylated mixture of primary linear $C_{12-15}$ aliphatic alcohols having an average of about 3 ethyleneoxy units per mole of alcohol and is commercially available under the designation "NEODOL-25-3." A preferred oil-soluble nonionic surfactant is an ethoxylated mixture of primary linear $C_{9-11}$ aliphatic alcohols having an average of about 2.5 ethyleneoxy units per mole of alcohol. This particular surfactant is commercially available under the designation "NEODOL-91-2.5."

For de-inking, the appropriate water-soluble and oil-soluble surfactants are selected from the aforementioned groupings, preferably to provide for the surfactant mixture an HLB value of about 10.9 to about 11.8. To make up the de-inking solution, the surfactants can be added separately or they can be combined beforehand and introduced at the same time. Most preferably, at least one water-soluble surfactant is selected having an HLB value of about 11 or higher, and at least one oil-soluble surfactant is selected having an HLB value of about 8 or lower to provide a surfactant mixture or blend with an HLB value within the aforementioned range.

Utilizing the mixture or blend of surfactants constituted as set forth above, de-inking can be effectively carried out within a relatively short time period, i.e., about 45 minutes or less, when the de-inking solution is maintained at a temperature of about room temperature up to about the boiling temperature of the de-inking solution depending on the nature of the waste paper stock that is to be de-inked. Generally, the higher the temperature the shorter the de-inking time; however, at the higher temperatures vaporization losses increase and more make-up water has to be added. For magazine stock, ledger stock, wax-coated paper, and the like, de-inking is carried out preferably at a temperature of about 140° F.. and higher, usually at about 160° F. to about 180° F., for a time period of about 10 to about 30 minutes. If pressure equipment is available, the solution boiling temperature and thus the de-inking temperaure may be increased up to about 265° F. or higher. For newsprint and similar waste paper stock, the de-inking is carried out preferably at a temperature of about 70° F. to about 120° F. and more preferably at a temperature of about 70° F. to about 90° F.

The pH value of the de-inking solution can be acidic, substantially neutral, or alkaline depending on the type of waste paper stock that is processed and can be as low as about 6, and lower, or as high as about 12.5 and higher. In order to minimize the likelihood of fiber discoloration and loss of lignin under medium to highly alkaline conditions, for newsprint de-inking the aqueous surfactant solution preferably is acidic to approximately neutral (i.e., having a pH of about 6 to about 7.5). On the other hand, for de-inking magazine stock, wax-coated paper, ledger stock, and the like, the de-inking conditions must be such as to hydrolyze the ink resins, thus an alkaline solution, usually having a pH of about 7 to about 12.5, or greater, is preferred; more preferably the de-inking solution has a pH of about 11 to about 12.5. For ink resins that are difficult to hydrolyze, the de-inking solution can have a pH as high as about 13.

In any given instance the de-inking solution can be rendered alkaline by the addition of an alkaline-reacting material such as sodium hydroxide, or an alkaline buffer such as sodium bicarbonate, sodium sesquicarbonate, borax, or the like. The specific nature of the alkaline buffer or of the alkaline-reacting material is not of consequence as long as the desired pH value of the de-inking solution can be maintained.

Sodium hydroxide is the preferred alkaline-reacting material. To adjust the pH of the de-inking solution to a value of about 11 to about 12.5, about 1 to about 3 weight percent of sodium hydroxide, based on the weight of fibrous material solids present, is usually added to the slurry of waste paper stock.

From the standpoint of preferred practice, the surfactants present in the de-inking solution occasionally may produce excessive foaming during the pulping or agitation period. When such difficulty is encountered, it is desirable to add an anti-foaming agent to the de-inking solution. Anti-foaming agents suitable for this purpose are commercially available, and the selection and use thereof will be apparent to those skilled in this art.

After the separation of the fibrous material from ink has been effected, the slurry from the "Hydropulper" is dropped to a chest or another suitable reservoir and further processed in accordance with conventional practice.

In contrast to prior art de-inking processes, the de-inking process embodying the present invention greatly increases the cleaning and removal of ink particles from waste paper and yields paper stock having good brightness before bleaching. Further treatment of the paper stock by conventional bleaching and reduction processes results in paper stock of exceptional brightness that can be readily commingled with virgin pulp to produce paper.

The present invention is further illustrated by the following examples.

EXAMPLE I

For purposes of comparison, newsprint de-inking was carried out substantially in accordance with the procedure taught in Example 2 of U.S. Pat. No. 3,446,696 to Illingworth and also in accordance with the present invention. In each instance a newsprint slurry containing about 4 percent by weight fibrous material solids was prepared using dry newspapers and an aqueous surfactant solution. Aliquots of the slurry were subjected to a de-inking treatment followed by washing and then reduction. The reduction treatment was carried out with a 1 wt.-% aqueous sodium hydrosulfite solution for about one hour in each instance. The de-inked fibrous material solids were then formed into paper sheets which were evaluated for brightness. The processing conditions and the results are tabulated below.

| | Example 2 of U.S. 3,446,696 | Present Invention |
|---|---|---|
| solids content, wt.-% | 4 | 4 |
| temperature, °F. | 130 | 70 |
| surfactant, wt.-%, based on solids | 1.6[1] | 0.5[2] |
| tetrasodium pyrophosphate, wt.-%, based on solids | 1.5 | none |
| borax, wt.-%, based on solids | none | 1 |
| solution pH | 9.0 | 8.0 |
| cooking time, min. | 35 | 15 |
| washing | 3 times | 3 times |
| brightness[3] after washing | 48.6 | 50.3 |
| soluton pH after washing | 6.5 | 6.0 |
| brightness[3] after reduction | 52.6 | 60.3 |

[1]ethylene oxide adduct of nonyl phenol containing about 9.5 moles of ethylene oxide per mole of nonyl phenol.
[2]a surfactant mixture containing about 80 wt.-% of ethoxylated aliphatic alcohols derived from $C_{12-15}$ primary linear alcohols having about 7 moles of ethylene oxide per mole of alcohol (HLB about 12.0) and about 20 wt.-% of the same ethoxylated aliphatic alcohols having about 3 moles of ethylene oxide per mole of alcohol (HLB about 8.1). The HLB value of the resulting surfactant mixture was about 11.2.
[3]brightness in each instance was determined using a Gardner Reflectometer D-25.

From the foregoing results it is readily apparent that the present invention provides substantially improved brightness even at considerably milder processing conditions, i.e., lower temperature, lower pH, shorter cooking time, at a much lower surfactant concentration and without any phosphates present.

When processing waste paper at an elevated temperature, the cooking time is even shorter and the increase in brightness even more pronounced.

EXAMPLE II

Wax-coated waste paper was de-inked using, respectively, an aqueous solution containing only a water-soluble nonionic surfactant (Solution A) and an aqueous solution containing a mixture of a water-soluble nonionic surfactant and an oil-soluble nonionic surfactant (Solution B). The surfactant in Solution A was IGEPAL CO630, a nonylphenoxypoly(ethyleneoxy)ethanol having about 9 moles of ethyleneoxy units per mole of ethanol. The surfactant in Solution B was a mixture of four parts by weight of a water-soluble nonionic surfactant derived from a mixture of primary $C_{9-11}$ linear alcohols and having about 8 ethyleneoxy units per mole of alcohol (HLB about 12) and one part by weight of an oil-soluble nonionic surfactant derived from a similar mixture of alcohols and containing about 2.5 ethyleneoxy units per mole of alcohol (HLB about 7–8). In each instance dry wax-coated waste paper was slurried in the solution to provide a fibrous material solids content of about 4 percent by weight. The amount of surfactant present in the produced slurries was about one weight percent of the fibrous material solids content. Each slurry also contained sodium hydroxide in an amount of about two percent by weight of the fibrous material solids and had a pH value of about 12 to 12.5.

Each slurry was agitated for about 20 minutes at a temperature of about 170° F. Thereafter the fibrous material solids were recovered from the slurry, washed with water, and formed into hand sheets that were then dried and evaluated for whiteness using a Hunter Reflectometer D-25.

Hand sheets from waste paper de-inked using Solution A exhibited a whiteness of about 42.3, and hand sheets from waste paper de-inked using Solution B exhibited a whiteness of about 46.1.

EXAMPLE III

In a manner similar to Example II, de-inking of wax-coated waste paper was carried out using aqueous solutions of the same surfactants but in lesser amounts. That is, the total amount of surfactant present in each slurry was about 0.5 weight percent of the fibrous material solids present.

Hand sheet from waste paper de-inked using the solution containing only the water-soluble surfactant exhibited a whiteness of about 39.1, and individual wax particles were observed to be present in the hand sheet. However, hand sheet from waste paper de-inked using the 4:1 weight ratio mixture of the water-soluble surfactant and the oil-soluble surfactant, respectively, exhibited a whiteness of about 45.4 and no wax particles were observed to be present.

EXAMPLE IV

Printed Kraft No. 1 waste paper from pizza cartons was de-inked using an aqueous solution of IGEPAL CO630 (available from GAF Corp. Chemical Products) and an aqueous solution of the same mixture of water-soluble and oil-soluble surfactants as used in Example II. The dry waste paper was slurried in the aqueous surfactant solutions in an amount to provide a solids concentration of about 4 weight percent. The amount of surfactant present in each instance was about one-half weight percent of the solids. Additionally, the slurry contained sodium hydroxide in an amount of about 2 weight percent of the solids to provide a pH of about 12 to 12.5.

Each slurry was agitated for about 20 minutes at about 170° F. Thereafter, the solids were recovered from the slurry, washed with water, and formed into hand sheets. The hand sheets were dried and evaluated for whiteness using a Hunter Reflectometer D-25.

Hand sheet from the Kraft No. 1 waste paper de-inked with only the water-soluble surfactant exhibited a whiteness of about 63.4, and visually discernible ink particles were present in the hand sheet. On the other hand, a hand sheet from the Kraft No. 1 waste paper de-inked using the water-soluble and oil-soluble surfactant mixture exhibited a whiteness of about 66.7, and no ink particles could be seen in the hand sheet.

EXAMPLE V

Dry ledger waste paper was pulped in aqueous surfactant

Dry ledger waste paper was pulped in aqueous surfactant solutions at a pH of about 12 to 12.5 to provide slurries containing about 4 percent by weight fibrous material solids. The alkalinity of each slurry was regulated by the addition of about 2 weight percent, based on the weight of solids, of sodium hydroxide. The aqueous surfactant solutions used for de-inking were the same as Solution A and Solution B of Example II. The produced slurry in each instance was agitated for a time period of about 20 minutes at a temperature of about 170° F. Thereafter the solids were recovered from the slurry, washed with water, and formed into hand sheets. The hand sheets were dried and evaluated for whiteness using a Hunter Reflectometer D-25.

De-inking using Solution A at total surfactant concentrations of one weight percent and one-half weight percent, based on the weight of solids, gave whiteness values of 53.3 and 29.7, respectively. However, de-inking using Solution B at total surfactant concentrations of one weight percent and one-half weight percent, based on the weight of solids, gave whiteness values of 57.3 and 59.1, respectively.

We claim:

1. A process for de-inking printed fibrous material which comprises the steps of:
    (a) adding said printed fibrous material in substantially dry form to an aqueous, surfactant-containing de-inking solution in an amount to form a slurry containing no more than about 10 weight percent of fibrous material solids, the aforesaid surfactants constituting a mixture of at least one water-soluble nonionic surfactant and at least one oil-soluble nonionic surfactant present in said slurry in an amount of about 0.1 to about 5 weight percent, based on the weight of said fibrous material solids, the weight ratio of said water-soluble nonionic surfactant to said oil-soluble nonionic surfactant in said mixture being in a range of about 6:1 to about 3:1, said water-soluble nonionic surfactant being ethoxylated aliphatic alcohols containing from 9 to 15 carbon atoms and having an average of about 7 to about 15 ethyleneoxy units per mole of alcohol, and said oil-soluble nonionic surfactant being ethoxylated aliphatic alcohols containing from 9 to 15 carbon atoms and having an average of about 0.5 to about 3.5 ethyleneoxy units per mole of alcohol; and
    (b) agitating said slurry at a temperature in the range of about room temperature to about the boiling temperature of the solution to reduce said fibrous material substantially to individual fibers and to separate the ink present on the fibers therefrom.

2. The process in accordance with claim 1 wherein the de-inking solution is at a temperature in excess of about 140° F., and is alkaline.

3. The process in accordance with claim 2 wherein the de-inking solution is at a temperature of about 160° F. to about 180° F. and has a pH of about 11 to about 12.5.

4. The process in accordance with claim 1 wherein the printed fibrous material is newsprint, and wherein the de-inking solution is at a temperatue of about 70° F. to about 120° F.

5. The process in accordance with claim 1 wherein the printed fibrous material is newsprint, and wherein the de-inking solution is at a temperature of about 70° F. to about 90° F. and has a pH of about 6 to about 7.5.

6. The process in accordance with claim 1 wherein the weight ratio of water-soluble nonionic surfactant to oil-soluble nonionic surfactant is about 4:1.

7. The process in accordance with claim 1 wherein the water-soluble nonionic surfactant is a mixture of ethoxylated primary linear $C_{12-15}$ alcohols containing about 7 to about 15 ethyleneoxy units per mole of alcohol.

8. The process in accordance with claim 1 wherein the water-soluble nonionic surfactant is a mixture of ethoxylated primary linear $C_{9-11}$ alcohols containing about 8 ethyleneoxy units per mole of alcohol.

9. The process in accordance with claim 1 wherein the water-soluble nonionic surfactant is a mixture of ethoxylated primary linear $C_{9-11}$ alcohols containing about 8 ethyleneoxy units per mole of alcohol and wherein the oil-soluble nonionic surfactant is a mixture of ethoxylated primary linear $C_{9-11}$ alcohols containing about 2.5 ethyleneoxy units per mile of alcohol.

10. The process in accordance with claim 9 wherein said water-soluble nonionic surfactant and said oil-soluble nonionic surfactant are present in a respective weight ratio of about 4:1.

11. The process in accordance with claim 1 wherein the amount of nonionic surfactant present provides a critical micelle concentration in the de-inking solution.

12. The process in accordance with claim 1 wherein said mixture of surfactants has a hydrophile-lipophile balance of about 10.9 to about 11.8.

13. The process in accordance with claim 1 wherein the de-inking solution has a pH of about 6 to about 12.5.

14. The process in accordance with claim 13 wherein the de-inking solution contains sodium hydroxide.

15. A process for de-inking printed fibrous material which comprises the steps of:
    (a) adding said printed fibrous material in sustantially dry form to an aqueous, biodegradable surfactant-containing de-inking solution having a pH of about 7 to about 12.5, in an amount to form a slurry containing about 3 to about 8 weight percent of fibrous material solids and about 0.5 to about 2.5 weight percent, based on the weight of said fibrous material solids, of a mixture of at least one water-soluble nonionic surfactant and at least one oil-soluble nonionic surfactant wherein the weight ratio of said water-soluble nonionic surfactant to said oil-soluble nonionic surfactant in said mixture is about 4:1, said surfactants are ethoxylated aliphatic monohydroxy alcohols containing from 9 to 15 carbon atoms, said water-soluble surfactant contains at least about 7 ethyleneoxy units per mole of monohydroxy alcohol, and said oil-soluble surfactant contains about 0.5 to about 3.5 ethyleneoxy units per mole of monohydroxy alcohol; and (b) agitating said slurry at a temperature in the range of about room temperature to about the boiling temperature of the solution to reduce said fibrous material substantially to individual fibers and to separate the ink present on the fibers therefrom.

16. The process in accordance with claim 15 wherein the de-inking solution is at a temperature in excess of about 140° F.

17. The process in accordance with claim 15 wherein the de-inking solution is at a temperature of about 160° F. to about 180° F.

18. The process in accordance with claim 15 wherein said water-soluble nonionic surfactant is a mixture of ethoxylated primary linear $C_{9-11}$ alcohols containing about 8 ethyleneoxy units per mole of alcohol, wherein said oil-soluble nonionic surfactant is a mixture of ethoxylated primary linear $C_{9-11}$ alcohols containing about 2.5 ethyleneoxy units per mole of alcohol, and wherein the de-inking solution is at a temperature of about 160° F. to about 180° F. and has a pH value of about 11 to about 12.5.

19. The process in accordance with claim 15 wherein said water-soluble nonionic surfactant is a mixture of ethoxylated primary linear $C_{9-11}$ alcohols containing about 8 ethyleneoxy units per mole of alcohol, wherein said oil-soluble nonionic surfactant is a mixture of ethoxylated primary linear $C_{9-11}$ alcohols containing about 2.5 ethyleneoxy units per mole of alcohol, and wherein the de-inking solution is at a temperature of about 70° F. to about 90° F.

* * * * *